Dec. 29, 1959 B. CORNELISON 2,919,387

POINT CONTACT SEMICONDUCTOR DEVICE

Filed June 5, 1953

INVENTOR.
Boyd Cornelison
BY
Stevens, Davis, Miller & Mosher
ATTORNEYS

1

2,919,387

POINT CONTACT SEMICONDUCTOR DEVICE

Boyd Cornelison, Dallas, Tex., assignor to Texas Instruments Incorporated, Dallas, Tex., a corporation of Delaware Application June 5, 1953, Serial No. 359,700

23 Claims. (Cl. 317—235)

This invention relates to semiconductor devices of the point contact type for use as amplifiers, oscillators, or the like, and in particular, to a novel and simplified method of constructing the point contact electrodes.

The three-electrode semiconductor is a comparatively recent but now well known development in the field of electronics, having been disclosed originally in the July 15, 1948 issue of "Physical Review" by a series of three letters from Bardeen and Brattain, Brattain and Bardeen, and Shockley and Pearson. The disclosed device uses a block of germanium formed as an N-type or excess electron semiconductor. Three electrodes are placed in contact with the block of germanium, two on the upper surface and the other on the under surface. The two electrodes on the upper surface, called the emitter and collector electrodes, are formed with small area points and placed in close proximity to each other while the electrode in contact with the under surface, called the base electrode, is a large area, low resistance or ohmic contact. The emitter and collector electrodes are spring shaped so that when pressed into contact with the germanium block, a relatively large pressure is created by the small area points which convert the N-type germanium immediately underneath the points into P-type germanium.

The circuit used in conjunction with the semiconductor triode of the publication connects the input circuit between the emitter and the base and the output circuit between the collector and the base. By placing a positive bias voltage on the emitter and a negative bias voltage on the collector, a current is injected at the emitter which is attracted to the collector; so, on varying the emitter current by introducing an alternating signal voltage, there is a corresponding variation in collector current. The publication referred to above discloses that the flow of a positive current from the emitter into the collector alters the normal current flow from the base to the collector in such a way that the change in collector current is larger than the change in emitter current. Consequently, there is a resulting amplification of the input signal through the semiconductor.

A semiconductor device of the type described in the above mentioned publication presents many practical difficulties in manufacturing. The emitter and collector electrodes are made from wire with a diameter of approximately .005 of an inch. The ends of the wires, which in the final construction will be in contact with the semiconductor material, are further reduced by some means such as grinding, shearing, or etching. An example of a method of etching wires to produce point contacts is disclosed in Patent No. 2,628,936 to Albano. Beyond the difficulty of forming the necessary points on the ends of the already small diameter wires, the points when in contact with the semiconductor material are usually spaced about .002 of an inch apart. The difficulty of spacing the electrodes with any accuracy is further increased due to the low resistance of wire to lateral movement. The electrodes, upon being subjected to lateral forces, have a tendency to "skate" into contact with each other and consequently short out the semiconductor device. Furthermore, since the contact pressure must be high to convert the semiconductor material in the areas beneath the points of the electrodes from an N-type material to a P-type material and to render the points more stable, the electrodes must be made from a stiff spring-like metal. This, in turn, further increases the difficulty of positioning the electrodes to maintain the critical .002 of an inch spacing.

2

Recognizing the difficulties presented in using wire electrodes for point contacts, various attempts have been made to overcome these difficulties. One construction advanced to resist the tendency of the wire to move laterally consists in forming and rolling the middle section of the wire into a flat S-shaped spring section. The contact with the semiconductor wafer, however, is still made by a sharp wire point contact. This arrangement makes it necessary to place the electrodes on opposite side of the semiconductor block as the critical spacing between the electrodes could not be otherwise obtained. Other structures propose the use of flat sheet metal strips formed with a knife edge and placed in contact with one edge of an oblong cube of semiconductor material. These flat metal strips are mounted from posts above the semiconductor wafer and depend on the stiffness of the metal strip section to supply the necessary contact pressure. One drawback of these structures is that the base must be specially formed to mount the cube of semiconductor material to provide an edge for point contact with the knife edge electrodes. Another device offers as a solution of the problem the use of two flat metal strips formed into an S-shaped spring section and separated the desired distance by a layer of insulating plastic cement. These strips are also formed with knife edges and contact a ridge formed on a germanium wedge. Since these sections are bonded together, great care must be taken to fabricate and to join the two springs to insure that both knife edges have the proper contact with and apply the proper pressure to the semiconductor material.

Accordingly, it is a general object of this invention to provide a point contact semiconductor device which is easy to manufacture, simple and accurate to assemble, and uniform in electrical characteristics.

More specifically, it is an object of the present invention to manufacture a point contact semiconductor device in which the point contact electrodes are made from resilient metal strips of such a width as to provide a high resistance to lateral movement.

It is another object of this invention to shear the resilient metal strips to provide the requisite point contact rather than grind or etch the metal strips to a knife edge. In this regard, the metal strip with the sheared point contact is placed in contact with a flat surface of a germanium wafer which does not require a special shape or one that is wasteful and difficult to manufacture.

It is still another purpose of the present invention to control the spacing between the electrode point contacts by shearing away overlapping portions of each metal strip. Consequently, the width of the material sheared from the metal strips controls the spacing between the points in the final product.

Other objects and features of the present invention will become apparent from a detailed consideration of the following description when taken in conjunction with the appended drawings in which.

Figures 1, 2, 3, 4, 5:
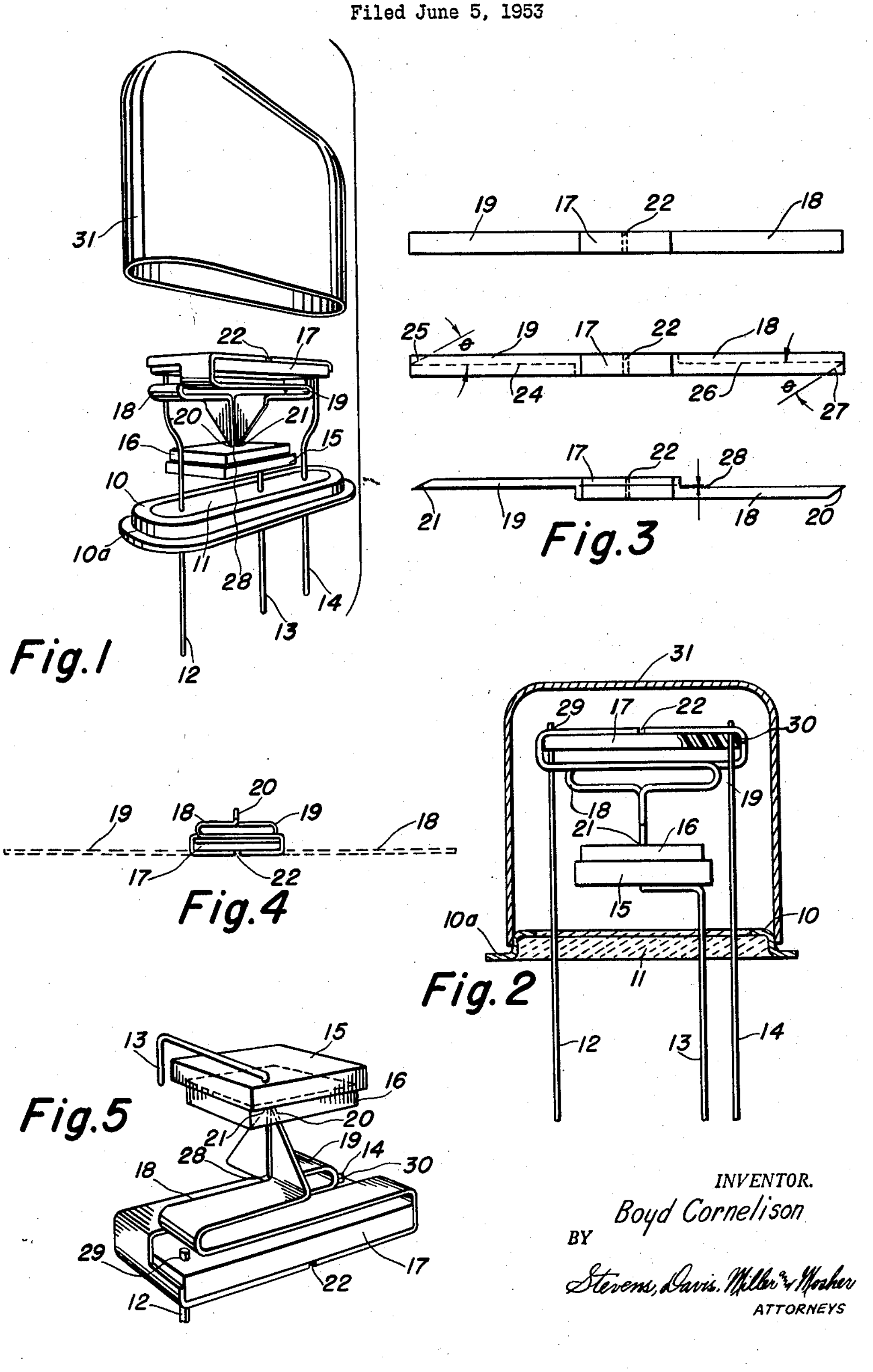
Figure 1 is a perspective view of the preferred embodiment of the present invention utilizing flat metal strips as emitter and collector electrodes.
Figure 2 is a front elevation in partial cross section of the preferred embodiment of the present invention.
Figure 3 is a plan view in three parts representing the flat metal electrode strips before and after fabrication.
Figure 4 illustrates the electrode strips formed into S-shaped, cantilever supported springs after fabrication.
Figure 5 illustrates a modification of the present invention in which the semiconductor wafer is elevated above the point contacts.

Referring now to the drawings and particularly to Figure 3, the fabrication of the flat metal strips into suitable point contact electrodes is shown in three successive views. The upper portion of Figure 3 illustrates the two flat metal strips 18 and 19 fixed by some bonding material to an insulating base 17. The preferred material for the metal strips 18 and 19 is either beryllium copper or Phosphor bronze with a thickness of .003 inch and the preferred material for the base 17 is a phenolic plastic. The mention of these specific materials though is not meant to exclude the possibility of using other suitable materials. Strips 18 and 19 when fixed in position on insulating base 17 are separated by a space 22 in order to isolate the two electrodes electrically. The central view of Figure 3 shows in dotted lines the material which is to be sheared away from the strips to fabricate the point contact electrodes. Strip 19 is sheared along dotted line 24 to remove the portion which would otherwise overlap and contact strip 18 and cut at an angle along dotted line 25 to form the point. The angle $\theta$ can vary from 10° to 90° from a vertical line when the point is in position to contact the germanium wafer. Although dotted line 25 is drawn at an angle, experimentation has proved that satisfactory results can be obtained even when the strips 18 and 19 are not formed with a point and only a straight edge is placed in contact with the germanium wafer. Strip 18 is formed along the dotted lines 26 and 27 in like manner to strip 19. After the portions of strips 18 and 19 have been removed by shearing along the dotted lines, the electrodes assume the shape shown in the bottom view of Figure 3. Each strip is sheared very slightly past its mid-point to allow a clear space between the points after the electrodes are formed into springs. This space between the points is represented by the numeral 28.

The shape assumed by the metal strips 18 and 19 after the strips are bent upward from the straight line dotted position is shown in Figure 4. The strips are actually formed into cantilever springs supported at either end of the insulating base 17 with the point contacts terminating on a line through the mid-point of the insulating base. The metal strips are formed into spring sections by means of a hand operated die although satisfactory results can be obtained by forming the strips into springs by hand methods without the use of a die.

The semiconductor device of the present invention is shown in its preferred embodiment in Figures 1 and 2 and is assembled in the following manner. The basic support structure for the semiconductor device consists of header 10 and wires 12, 13, and 14. The wires 12, 13, and 14 are suitably spaced and maintained in header 10 by an insulating material 11 which is glass in the device of the present invention. Header 10 is oblong in shape, rounded on either end and formed with a flange 10*a* which follows the contour of the header 10. The middle wire 13 is bent over at 90° from the vertical and base electrode 15 welded or soldered in a level position on wire 13. Base electrode 15 is composed of brass or some other conducting material. The semiconductor wafer 16, which in this invention is germanium formed as an N-type semiconductor, is fixed in position on base electrode 15 by soldering or an equivalent method to form a low resistance contact with the base electrode. As shown in Figure 2, a hole 29 is drilled through one end of insulating base 17 and through the portion of strip 19 fixed to the base 17. In like manner, a hole 30 is drilled through the opposite end of insulating base 17 and the metal strip 18. Since the holes are not drilled along the centerline of insulating base 17, wires 12 and 14 are bent slightly out of line from the vertical as shown in Figure 1 to engage and extend through holes 29 and 30.

After the germanium wafer 16 is positioned on base electrode 15, the electrode and insulating base component is placed in position with the points 20 and 21 extending downward to contact the germanium wafer 16 and with wire 12 extending through hole 29 and wire 14 extending through hole 30. When the springs have been depressed sufficiently to insure that the proper pressure is applied through the points 20 and 21 to germanium wafer 16, the electrode and base assembly is held in that position and the wires 12 and 14 soldered to the portions of the metal strips 18 and 19 fixed to the insulating base. This arrangement assures that a constant pressure will be maintained on the germanium wafer and provides the necessary electrical contact to each electrode. The semiconductor device is completed by placing cover 31 on header 10 and soldering cover 31 to the flange 10*a* extending around the header.

A modification of the preferred embodiment of the present invention is shown in Figure 5 in which the germanium wafer is elevated to a position above the spring point contacts. In this embodiment, wire 13 is bent 90° from the vertical to extend over the centerline of the semiconductor device and at a height to correctly position germanium wafer 16 for contact with points 20 and 21. It will be noted that the various elements of the device shown in Figure 5 are numbered the same as in the other figures although they occupy different positions. The brass base 15 is welded or soldered to the bent over portion of wire 13 and germanium wafer 16 fixed to the under side of base electrode 15 in a manner to insure the proper low resistance contact.

In placing the point contact electrodes in position, each spring is depressed to allow the wires 12 and 14 to extend through the holes 29 and 30. When the base and spring assembly is in position, the springs are released and the assembly moved upwardly until points 20 and 21 make contact with the germanium wafer and the proper spring pressure applied. This position is maintained and wires 12 and 14 soldered to the portions of strips 18 and 19 fixed to insulating base 17. As in the preferred embodiment, this construction maintains the necessary pressure on the germanium wafer and provides the required isolated electrical contact to each electrode.

Although this invention has been described in two specific embodiments, changes obvious to one skilled in the art are within the scope and intent of this invention.

What is claimed is:

1. A contact electrode component for a semi-conductor device that comprises two resilient strip electrodes, means fixing one end of each of said electrodes, and said electrodes formed into opposite S curves terminating in laterally spaced contact sections lying in a common plane.

2. A contact electrode component as defined in claim 1 wherein said contact sections are spaced approximately 0.002 inch apart.

3. A contact electrode component as defined in claim 1 wherein the edges bounding each said contact section form an angle between 10 and 90 degrees.

4. A contact electrode component for a semiconductor device that comprises an insulating base, two resilient strip electrodes with each having one end bonded to said base, and said electrodes formed into opposite S curves terminating in laterally spaced contact sections lying in a common plane.

5. A contact electrode component for a semiconductor device that comprises an insulating base, two resilient flat metal strips electrically insulated one from the other with each having one end bonded to said base, said strips being formed into opposite S curve spring sections terminating in contact sections which are spaced apart and lie in a common plane.

6. A contact electrode component as defined in claim 5 wherein said contact sections are spaced approximately 0.002 inch apart.

7. A contact electrode component as defined in claim 5 wherein the edges bounding each said contact section form an angle between 10 and 90 degrees.

8. A contact electrode component for a semiconductor device that comprises an insulating base, and two resilient flat metal strips electrically insulated one from the other with each having one end bonded to a surface of said base, said strips being bent around said insulating base about opposite ends thereof, said strips being formed into opposite S curve spring sections terminating in contact sections which are spaced apart and lie in a common plane.

9. A semiconductor device comprising a semiconductor body having a flat surface, a metallic support in low resistance contact with said body, two metal strip electrodes, means fixing one end of each of said electrodes, said electrodes being formed into opposite S curves terminating in contact sections which are spaced apart and lie in a common plane, and said contact sections being thrust into engagement with the surface of said body.

10. A semiconductor device comprising a semiconductor body having a flat surface, a metallic support in low resistance contact with said body, an insulating base, two resilient strip electrodes with each having one end bonded to said base, said electrodes formed into opposite S curves terminating in laterally spaced contact sections lying in a common plane, and said contact sections being thrust into engagement with the surface of said body.

11. A semiconductor device as defined in claim 9 wherein said contact sections are spaced approximately 0.002 inch apart.

12. A semiconductor device as defined in claim 9 wherein the edges bounding each said contact section form an angle between 10 and 90 degrees.

13. A semiconductor device comprising a semiconductor body having a flat surface, a metallic support in low resistance contact with said body, an insulating base, two resilient flat metal strips electrically insulated one from the other with each having one end bonded to said base, said strips being formed into opposite S curved spring sections terminating in contact sections which are spaced apart and lie in a common plane, said contact sections being thrust into engagement with the surface of said body.

14. A semiconductor device comprising a semiconductor body having a flat surface, a metallic support in low resistance contact with said body, an insulating base, two resilient flat metal strips electrically insulated one from the other with each having one end bonded to a surface of said base, said strips being bent around said insulating base about opposite ends thereof and being formed into opposite S curved spring sections terminating in contact sections which are spaced apart and lie in a common plane, said contact sections being thrust into engagement with the surface of said body.

15. A method of fabricating a point contact component for a semiconductor device that comprises bonding one end of each of two flat metal strips to an insulating base in a laterally overlapping relationship with the bonded ends of said strips insulated from each other, shearing at least one of said strips thereby removing a portion of said strip to leave the free ends of said strips laterally spaced, and forming said strips into cantilever springs each having at least one U bend and terminating in contact sections lying in a common plane while maintaining the lateral spacing of said strips.

16. A method of fabricating a point contact component for a semiconductor device that comprises placing two elongated resilient strips in spaced axial registry, fixing the adjacent ends of said strips, removing a portion of each of said strips to leave the remote ends of said strips laterally spaced, and forming said strips into cantilever springs each having at least one U bend and terminating in contact sections lying in a common plane while maintaining the lateral spacing of the remote ends of said strips.

17. A method of fabricating a point contact component for a semiconductor device that comprises placing two elongated resilient strips in spaced axial registry, fixing the adjacent ends of said strips, longitudinally shearing away a portion of said strips past their midpoints to leave the remote ends of said strips laterally spaced, and forming said strips into cantilever springs each having at least one U bend and terminating in contact sections lying in a common plane at the remote ends of said strips while maintaining the lateral spacing of the remote ends of said strips.

18. A contact electrode component for a semi-conductor device that comprises two resilient strip electrodes, means fixing one end of each of said electrodes with the fixed ends lying adjacent to each other and in a common plane, the free portions of said electrodes projecting in opposite directions and being oppositely formed into cantilever springs each having at least one U bend and terminating in closely spaced contact sections.

19. A semi-conductor device comprising a semi-conductor body, two metal strip electrodes, means fixing one end of each of said electrodes with the fixed ends lying adjacent to each other and in a common plane, the free portions of said electrodes projecting in opposite directions and being oppositely formed into cantilever springs each having at least one U bend and terminating in closely spaced contact sections lying in a common plane, and said contact sections being thrust into engagement with said body.

20. A method of fabricating a point contact component for a semi-conductor device from two flat metal strips that includes the steps of fixing one end of each of two flat metal strips to electrical conductors with the fixed ends lying adjacent to each other and the free ends of said strip electrodes projecting in opposite directions, said strip electrodes lying in a common plane, forming the free portions of each said strip into at least one U bend thereby attributing to said strip spring characteristics, and establishing semi-conductor contact sections for each said strip.

21. A method as defined in claim 20 wherein semi-conductor contact sections are established by forming the edges bounding each said contact section to an angle between 10 and 90 degrees.

22. A method of fabricating a contact component for a semi-conductor device that comprises positioning two flat metal strips on an insulating base with the axes of said strips laterally spaced by a distance equal to no more than one-half the sum of the widths of the two strips and with said strips being electrically insulated each from the other, shearing at least one of said strips thereby removing a lateral portion of said strip to leave the remote ends of said strips laterally spaced, and forming said strips into cantilever springs each having at least one U bend and terminating in contact sections lying in a common plane while maintaining the lateral spacing of the contact sections.

23. A method of fabricating a contact component for a semi-conductor device that comprises positioning two flat metal strips on an insulating base with their longitudinal axes in alignment and with said strips electrically insulated from each other, bonding said strips to said base, removing a lateral portion of each of said strips to leave the remote ends of said strips laterally spaced, and forming said strips into cantilever springs each having at least one U bend and terminating in contact sections lying in a common plane while maintaining the lateral spacing of the remote ends of said strips.

References Cited in the file of this patent

UNITED STATES PATENTS

| | | |
|---|---|---|
| 1,885,108 | Bullinger | Nov. 1, 1932 |
| 2,154,301 | Clement | Apr. 11, 1939 |
| 2,154,302 | Clement | Apr. 11, 1939 |
| 2,584,461 | James et al. | Feb. 5, 1952 |
| 2,615,965 | Amico | Oct. 28, 1952 |
| 2,673,311 | Amico | Mar. 23, 1954 |
| 2,696,574 | Rich | Dec. 7, 1954 |
| 2,696,575 | Fogg | Dec. 7, 1954 |
| 2,744,308 | Loman | May 8, 1956 |